United States Patent
Ding et al.

(10) Patent No.: US 11,393,241 B2
(45) Date of Patent: Jul. 19, 2022

(54) IMAGING BACKPLANE, DRIVING METHOD THEREOF AND FINGERPRINT IDENTIFICATION PANEL

(71) Applicant: BOE Technology Group Co., Ltd., Beijing (CN)

(72) Inventors: Xiaoliang Ding, Beijing (CN); Haisheng Wang, Beijing (CN); Yingming Liu, Beijing (CN); Lei Wang, Beijing (CN); Xueyou Cao, Beijing (CN); Jiabin Wang, Beijing (CN); Ping Zhang, Beijing (CN); Yapeng Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/734,565

(22) PCT Filed: May 25, 2020

(86) PCT No.: PCT/CN2020/092106
§ 371 (c)(1),
(2) Date: Dec. 3, 2020

(87) PCT Pub. No.: WO2020/244405
PCT Pub. Date: Dec. 10, 2020

(65) Prior Publication Data
US 2021/0264127 A1    Aug. 26, 2021

(30) Foreign Application Priority Data

Jun. 5, 2019 (CN) .......................... 201910487416.3

(51) Int. Cl.
*G06V 40/12* (2022.01)
*H04N 5/369* (2011.01)
*G06V 40/13* (2022.01)

(52) U.S. Cl.
CPC ....... *G06V 40/1318* (2022.01); *H04N 5/3698* (2013.01)

(58) Field of Classification Search
CPC . G06K 9/0004; H04N 5/3698; G06V 40/1318
See application file for complete search history.

(56) References Cited

U.S. PATENT DOCUMENTS

| 2004/0239786 A1 | 12/2004 | Masuyama et al. |
| 2005/0264666 A1 | 12/2005 | Iwasawa et al. |

(Continued)

FOREIGN PATENT DOCUMENTS

| CN | 1591892 A | 3/2005 |
| CN | 101135821 A | 3/2008 |

(Continued)

OTHER PUBLICATIONS

International Search Report for PCT/CN2020/092106 dated Sep. 1, 2020.

(Continued)

*Primary Examiner* — Stephen G Sherman
(74) *Attorney, Agent, or Firm* — Ling Wu; Stephen Yang; Ling and Yang Intellectual Property (57) ABSTRACT

An imaging backplane, a driving method thereof and a fingerprint identification panel are provided, the imaging backplane includes M rows and N columns of imaging structures, 2M rows of first signal lines, 2N columns of second signal lines, a first reset sub-circuit and a second reset sub-circuit; wherein each imaging structure includes a first imaging unit and a second imaging unit; the first imaging unit of the imaging structure of row i and column j is connected with the first signal line of row $2i-1$ and the second signal line of column $2j-1$ respectively, and the second imaging unit of the imaging structure of row i and (Continued)

column j is connected with the first signal line of row $2i$ and the second signal line of column $2j$ respectively.

9 Claims, 3 Drawing Sheets

(56) References Cited

U.S. PATENT DOCUMENTS

| | | | |
|---|---|---|---|
| 2007/0091013 A1* | 4/2007 | Pak | G02F 1/13338 345/50 |
| 2007/0290143 A1 | 12/2007 | Kameshima et al. | |
| 2009/0219277 A1 | 9/2009 | Teranishi et al. | |
| 2014/0043274 A1* | 2/2014 | Yao | G06F 3/04164 345/173 |
| 2014/0233700 A1 | 8/2014 | Nishino et al. | |
| 2014/0293105 A1 | 10/2014 | Sugawa | |
| 2015/0077607 A1 | 3/2015 | Yamazaki et al. | |
| 2017/0046555 A1 | 2/2017 | Lee | |
| 2017/0220839 A1* | 8/2017 | Yang | G06K 9/0004 |
| 2019/0075265 A1 | 3/2019 | Ishii et al. | |
| 2019/0102039 A1 | 4/2019 | Uehara et al. | |
| 2019/0289240 A1 | 9/2019 | Zhu et al. | |
| 2020/0342813 A1 | 10/2020 | Gao et al. | |

FOREIGN PATENT DOCUMENTS

| | | |
|---|---|---|
| CN | 101442603 A | 5/2009 |
| CN | 101491086 A | 7/2009 |
| CN | 102214663 A | 10/2011 |
| CN | 103988494 A | 8/2014 |
| CN | 104023637 A | 9/2014 |
| CN | 104469202 A | 3/2015 |
| CN | 106446763 A | 2/2017 |
| CN | 108776797 A | 11/2018 |
| CN | 108922493 A | 11/2018 |
| CN | 109509428 A | 3/2019 |
| CN | 109845243 A | 6/2019 |
| CN | 110210421 A | 9/2019 |

OTHER PUBLICATIONS

Office Action dated Oct. 27, 2020 for Chinese Patent Application No. 201910487416.3 and English Translation.

* cited by examiner

IMAGING BACKPLANE, DRIVING METHOD THEREOF AND FINGERPRINT IDENTIFICATION PANEL

The present application claims priority of Chinese Patent Application filed with China Patent Office on Jun. 5, 2019, with the application number 201910487416.3 and entitled "Imaging backplane, driving method thereof and fingerprint identification panel", the contents of which are incorporated herein by reference in their entirety.

TECHNICAL FIELD

The present disclosure relates to, but is not limited to, the technical field of imaging, in particular to an imaging backplane, a driving method thereof and a fingerprint identification panel.

BACKGROUND

Fingerprint identification refers to that an identity distinguishing is performed by comparing detailed feature points of different fingerprints. Because everyone has different fingerprints, even for ten fingers of a same person, their fingerprints are also different, so fingerprints can be used for identity authentication.

Point light source imaging is an implementation of fingerprint identification. The point light source imaging is mainly implemented by two point light sources and a photoelectric sensor, its working principle is as follows: two point light sources are turned on in a time-sharing manner, light of each point light source is directed to the finger, and the photoelectric sensor receives the light reflected by the finger to identify the fingerprint.

SUMMARY

The following is a summary of the subject matter described in detail in the present disclosure. This summary is not intended to limit the protection scope of the claims.

In a first aspect, the present disclosure provides an imaging backplane including M rows and N columns of imaging structures, 2M rows of first signal lines, 2N columns of second signal lines, a first reset sub-circuit and a second reset sub-circuit;

wherein each imaging structure includes a first imaging unit and a second imaging unit; the first imaging unit of the imaging structure of row i and column j is connected with the first signal line of row $2i$-1 and the second signal line of column $2j$-1 respectively, and the second imaging unit of the imaging structure of row i and column j is connected with the first signal line of row $2i$ and the second signal line of column $2j$ respectively, where $1 \leq i \leq M$ and $1 \leq j \leq N$;

the first reset sub-circuit is respectively connected with a first reset terminal, a low-level power supply terminal and the second signal lines of all odd-numbered columns, and is configured to provide a signal of the low-level power supply terminal to the second signal lines of all the odd-numbered columns under control of the first reset terminal, so as to reset the first imaging units; and the second reset sub-circuit is respectively connected with a second reset terminal, the low-level power supply terminal and the second signal lines of all even-numbered columns, and is configured to provide the signal of the low-level power supply terminal to the second signal lines of all the even-numbered columns under control of the second reset terminal, so as to reset the second imaging units.

In some possible implementations, for the imaging structure of row i and column j, the first imaging unit includes P first imaging subunits, and the second signal lines of column $2j$-1 include P columns of first sub-signal lines, and the P columns of first sub-signal lines correspond to the P first imaging subunits in a one-by-one manner;

each first imaging subunit comprises a photoelectric sensor and a first switching element;

the first switching element is respectively connected with the first signal line of row $2i$-1, the first sub-signal line corresponding to the first imaging subunit and the photoelectric sensor, where $P \geq 1$.

In some possible implementations, for the imaging structure of row i and column j, the second imaging unit includes Q second imaging subunits, and the second signal lines of column $2j$ include Q columns of second sub-signal lines, and the Q columns of second sub-signal lines correspond to the Q second imaging subunits in a one-by-one manner;

each second imaging subunit includes a photoelectric sensor and a second switching element; and the second switching element is respectively connected with the first signal line of row $2i$, the second sub-signal line corresponding to the second imaging subunit and the photoelectric sensor, where $Q \geq 1$.

In some possible implementations, the second signal line is multiplexed as a signal reading line, which is configured to read an electrical signal which is obtained by the photoelectric sensor according to received light.

In some possible implementations, for the imaging structures of row i and column j, the first switching element is a first transistor;

a control electrode of the first transistor is connected with the first signal line of row $2i$-1, a first electrode of the first transistor is connected with a first sub-signal line corresponding to a first imaging subunit where the first switching element is located, and a second electrode of the first transistor is connected with the photoelectric sensor.

In some possible implementations, for the imaging structure of row i and column j, the second switching element is a second transistor;

a control electrode of the second transistor is connected with the first signal line of row $2i$, a first electrode of the second transistor is connected with a second sub-signal line corresponding to a second imaging subunit where the second switching element is located, and a second electrode of the second transistor is connected with the photoelectric sensor.

In some possible implementations, the first reset sub-circuit comprises N third transistors;

a control electrode of each third transistor is connected with the first reset terminal, a first electrode of each third transistor is connected with the low-level power supply terminal, and a second electrode of the $j^{th}$ third transistor is connected with the second signal line of column $2j$-1.

In some possible implementations, the second reset sub-circuit comprises N fourth transistors;

a control electrode of each fourth transistor is connected with the second reset terminal, a first electrode of each fourth transistor is connected with the low-level power supply terminal, and a second electrode of the $j^{th}$ fourth transistor is connected with the second signal line of column $2j$.

In a second aspect, the present disclosure further provides a fingerprint identification panel including the above imaging backplane.

In a third aspect, the present disclosure further provides a driving method of an imaging backplane, which is applied to the above imaging backplane, including:

a first reset sub-circuit provides a signal of a low-level power supply terminal to second signal lines of all odd-numbered columns under control of a first reset terminal, so as to reset first imaging units; and a second reset sub-circuit provides the signal of the low-level power supply terminal to second signal lines of all even-numbered columns under control of a second reset terminal, so as to reset second imaging units.

Other aspects will become apparent upon reading and understanding accompanying drawings and the detailed description.

BRIEF DESCRIPTION OF DRAWINGS

Accompanying drawings are used to provide an understanding of technical solutions of the present disclosure and form a part of the specification, which are used for explaining technical solutions of the present disclosure in combination with the embodiments of the present disclosure, and do not constitute a limitation on the technical solutions of the present disclosure.

DETAILED DESCRIPTION

Hereinafter, embodiments of the present disclosure will be described in detail with reference to the accompanying drawings. Without conflict, embodiments in the present disclosure and features in the embodiments may be combined with each other arbitrarily.

Multiple embodiments are described in the present disclosure, but the description is exemplary rather than limiting, and for those of ordinary skills in the art, there may be more embodiments and implementation solutions within the scope of the embodiments described in the present disclosure. Although many possible combinations of features are shown in the accompanying drawings, and discussed in the specific embodiments, many other combination modes of the disclosed features are also possible. Unless specifically limited, any feature or element of any embodiment may be used in combination with or may replace any other feature or element of any other embodiment.

The present disclosure includes and contemplates combinations of features and elements known to those of ordinary skilled in the art. The disclosed embodiments, features and elements of the present disclosure may also be combined with any regular feature or element to form a technical solution of the present disclosure as defined by the claims. Any feature or element of any embodiment may also be combined with features or elements from other technical solutions to form another technical solution defined by the claims. Therefore, it should be understood that any of the features shown and discussed in the present disclosure may be implemented individually or in any suitable combination. Therefore, embodiments are not limited except by the limitations according to the appended claims and their equivalents. In addition, various modifications and changes can be made within the scope of protection of the appended claims.

Unless otherwise defined, technical terms or scientific terms used in the present disclosure shall have common meanings as construed by those of ordinary skills in the art to which the present disclosure pertains. The words "first", "second" and the like used in the present disclosure do not indicate any order, quantity or importance, but are only used for distinguishing different components. Similar words such as "including" or "containing" mean that elements or articles appearing before the word cover elements or articles listed after the word and their equivalents, and do not exclude other elements or articles. Similar words such as "connected" or "connected" are not limited to physical or mechanical connections, but may include electrical connections, whether direct or indirect. "Up", "down", "left", "right", etc. are only used for representing a relative position relation that may change accordingly when an absolute position of an object being described has changed.

A source and a drain of a transistor used in the present disclosure are symmetrical, the source and the drain may be interchanged. In the present disclosure, the gate is referred to as a control electrode. In order to distinguish the two electrodes of the transistor except the gate, the source may be referred to as a first electrode and the drain may be referred to as a second electrode, or the drain may be referred to as the first electrode and the source as the second electrode.

In the point light source imaging, there is a problem of afterimage with the photoelectric sensor. In order to eliminate the afterimage, the second point light source is turned on after an afterimage which is produced after the first point light source is turned on disappears, so that the time interval between time points of turning on the two point light sources is longer, resulting in a too long time for fingerprint identification.

Figure 1:
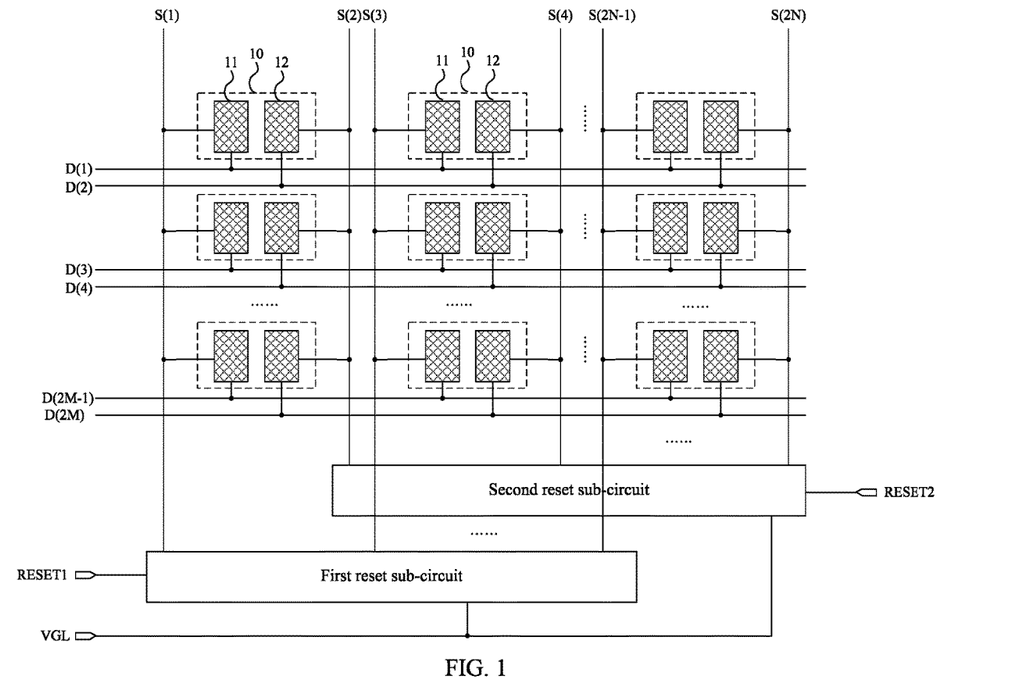
FIG. 1 is a schematic structural diagram of an imaging backplane according to an embodiment of the present disclosure.

FIG. 1 is a schematic structural diagram of an imaging backplane according to an embodiment of the present disclosure. As shown in FIG. 1, the imaging backplane according to the embodiment of the present disclosure includes M rows and N columns of imaging structures 10, 2M rows of first signal lines D(1) to D(2M), 2N columns of second signal lines S(1) to S(2N), a first reset sub-circuit and a second reset sub-circuit.

Each imaging structure 10 includes a first imaging unit 11 and a second imaging unit 12. The first imaging unit 11 of the imaging structure 10 of row i and column j is respectively connected with the first signal line D(2i-1) of row 2i-1 and with the second signal line S(2j-1) of column 2j-1, and the second imaging unit 12 of the imaging structure of row i and column j is respectively connected with the first signal line D(2i) of row 2i and with the second signal line S(2j) of column 2j.

The first reset sub-circuit is respectively connected with a first reset terminal RESET1, a low-level power supply terminal VGL and the second signal lines of all odd-numbered columns, and is configured to provide signals of the low-level power supply terminal VGL to the second signal lines of all odd-numbered columns under the control of the first reset terminal RESET1, so as to reset the first imaging unit.

The second reset sub-circuit is respectively connected with the second reset terminal RESET2, the low-level power supply terminal VGL and the second signal lines of all even-numbered columns, and is configured to provide the signals of the low-level power supply terminal VGL to the second signal lines of all even-numbered columns under the control of the second reset terminal RESET2, so as to reset the second imaging unit.

In an exemplary embodiment, $1 \leq i \leq M$, $1 \leq j \leq N$, wherein the values of M and N are determined according to accuracy of the fingerprint identification.

In an exemplary embodiment, 2M rows of first signal lines D(1) to D(2M) are arranged in parallel with each other, and 2N columns of second signal lines S(1) to S(2N) are arranged in parallel with each other. An extending direction of the first signal lines and an extending direction of the second signal lines are perpendicular to each other.

In an exemplary embodiment, the low-level power supply terminal VGL continuously provides a low-level signal, and a voltage value of the low-level signal may be 0V or other values.

The first imaging unit and the second imaging unit in each imaging structure are connected with different first signal lines and controlled by different first signal lines.

The imaging backplane according to the embodiment of the present disclosure may be applied to point light source imaging. Different imaging units receive light in a time-sharing manner. When the first point light source is turned on, the first imaging unit receives the light emitted by the first point light source, and the second reset sub-circuit resets the second imaging unit to avoid residual charge caused by the second imaging unit receiving the light emitted by the first point light source. When the second point light source is turned on, the second imaging unit receives the light emitted by the second point light source, and the first reset sub-circuit resets the first imaging unit to avoid residual charge caused by the first imaging unit receiving the light emitted by the second point light source, which can eliminate the influence of afterimage during the fingerprint identification.

The imaging backplane according to the embodiment of the present disclosure includes M rows and N columns of imaging structures, 2M rows of first signal lines, 2N columns of second signal lines, a first reset sub-circuit and a second reset sub-circuit; wherein each imaging structure includes a first imaging unit and a second imaging unit; the first imaging unit of the imaging structure of row i and column j is connected with the first signal line of row 2i-1 and the second signal line of column 2j-1 respectively, and the second imaging unit of the imaging structure of row i and column j is connected with the first signal line of row 2i and the second signal line of column 2j respectively; the first reset sub-circuit is connected with the first reset terminal, the low-level power supply terminal and the second signal lines of all odd-numbered columns respectively, and is configured to provide signals of the low-level power supply terminal to the second signal lines of all odd-numbered columns under the control of the first reset terminal so as to reset the first imaging unit; the second reset sub-circuit is connected with the second reset terminal, the low-level power supply terminal and the second signal lines of all even-numbered columns respectively, and is configured to provide signals of the low-level power supply terminal to the second signal lines of all even-numbered columns under the control of the second reset terminal to reset the second imaging unit. According to the embodiment of the disclosure, different imaging units are arranged in each imaging structure, different imaging units receive light in a time-sharing manner, and the first reset sub-circuit and the second reset sub-circuit are arranged to globally reset the imaging units which do not receive light, so that the afterimage can be eliminated, the time interval between the time points of turning up the point light source can be reduced, thus the fingerprint identification time can be reduced.

Figure 2:
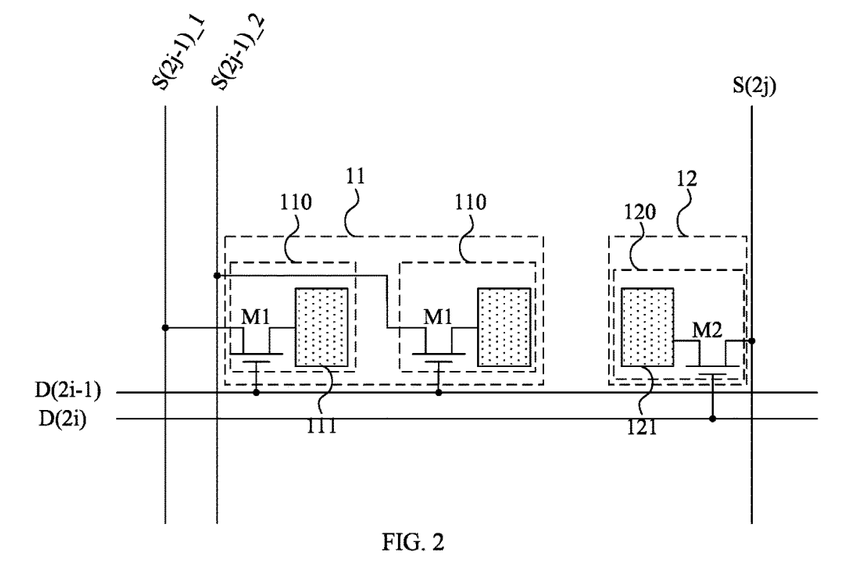
FIG. 2 is a structural schematic diagram of an imaging structure of row i and column j according to an exemplary embodiment.

FIG. 2 is a structural schematic diagram of the imaging structure of row i and column j according to an exemplary embodiment. As shown in FIG. 2, a first imaging unit 11 in an imaging backplane according to an exemplary embodiment includes: P first imaging subunits 110, and the second signal line S (2j-1) of column 2j-1 includes P columns of first sub-signal lines S(2j-1)_1 to S(2j-1)_P.

The P columns of first sub-signal lines correspond to the P first imaging subunits in a one-by-one manner, and the first imaging subunits are connected with the corresponding first sub-signal lines.

In an exemplary embodiment, as shown in FIG. 2, each first imaging subunit 110 includes a photoelectric sensor 111 and a first switching element, wherein the first switching element is respectively connected with the first signal line D (2i-1) of row 2i-1 and the first sub-signal line corresponding to the first imaging subunit and the photoelectric sensor.

In an exemplary embodiment, as shown in FIG. 2, the first switching element is a first transistor M1.

A control electrode of the first transistor M1 is connected with the first signal line D (2i-1) of row 2i-1, a first electrode of the first transistor M1 is connected with the first sub-signal line corresponding to the first imaging subunit where the first switching element is located, and a second electrode of the first transistor M1 is connected with the photoelectric sensor 111.

In an exemplary embodiment, $P \geq 1$. FIG. 2 is described by taking P=2 as an example.

In an exemplary embodiment, the first transistor M1 may be N-type or P-type transistor.

As shown in FIG. 2, a second imaging unit 12 in an imaging backplane according to an exemplary embodiment includes Q second imaging subunits 120, and the second signal line S(2j) of column 2j includes Q columns of second sub-signal lines S(2j)_1 to s (2j)_Q.

The Q columns of second sub-signal lines correspond to the Q second imaging subunits in a one-by-one manner, and the second imaging subunits are connected with corresponding second sub-signal lines.

In an exemplary embodiment, as shown in FIG. 2, each second imaging subunit 120 includes a photosensor 121 and a second switching element.

The second switching element is respectively connected with the first signal line D(2i) of row 2i, and the second sub-signal line corresponding to the second imaging subunit and the photoelectric sensor.

In an exemplary embodiment, as shown in FIG. 2, the second switching element is a second transistor M2.

A control electrode of the second transistor M2 is connected with the first signal line D(2i) of row 2i, a first electrode of the second transistor M2 is connected with the second sub-signal line corresponding to the second imaging subunit where the second switching element is located, and the second electrode of the second transistor M2 is connected with the photoelectric sensor 121.

In an exemplary embodiment, $Q \geq 1$. FIG. 2 is described by taking Q=1 as an example.

In an exemplary embodiment, the second transistor M2 may be a N-type or P-type transistor.

In an exemplary embodiment, the greater the quantities of P and Q are, the clearer the fingerprint image obtained is and the higher the accuracy of the fingerprint identification is.

In an exemplary embodiment, the quantities of P and Q may be equal or unequal, and FIG. 2 is described by taking the quantities of P and Q being unequal as an example.

In an exemplary embodiment, the second signal lines may be multiplexed as a signal reading line, which is configured to read the electrical signals obtained by the photoelectric sensors according to the received light.

In an exemplary embodiment, each second signal line is configured to read the electrical signal obtained by the photoelectric sensor in the first imaging unit according to the received light when the first point light source is turned on, and read the electrical signal obtained by the photoelectric sensor in the second imaging unit according to the received light when the second point light source is turned on.

Figure 3:
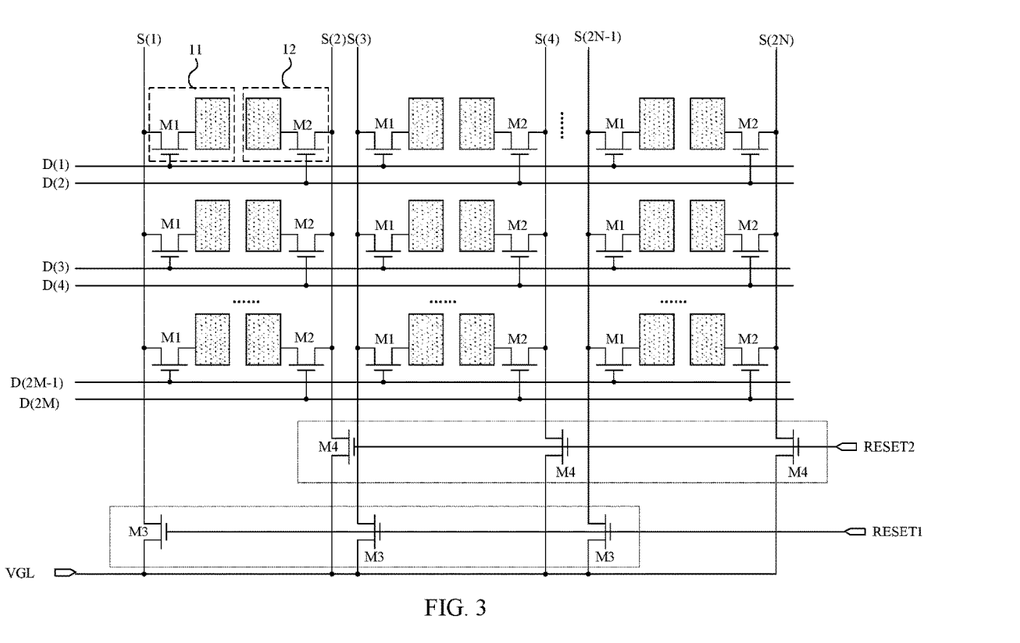
FIG. 3 is an equivalent circuit diagram of an imaging backplane according to an exemplary embodiment.

FIG. 3 is an equivalent circuit diagram of an imaging backplane according to an exemplary embodiment; As shown in FIG. 3, FIG. 3 is described by taking P=Q=1 as an example, a first reset sub-circuit in an imaging backplane according to an exemplary embodiment includes N third transistors M3.

A control electrode of each third transistor M3 is connected with a first reset terminal RESET1, a first electrode of each third transistor M3 is connected with a low-level power supply terminal VGL, and a second electrode of the $j^{th}$ third transistor M3 is connected with the second signal line S (2j-1) of column 2j-1.

In an exemplary embodiment, the third transistor M3 may be a P-type or N-type transistor.

As shown in FIG. 3, a second reset sub-circuit in an imaging backplane according to an exemplary embodiment includes N fourth transistors M4.

A control electrode of each fourth transistor M4 is connected with the second reset terminal RESET2, a first electrode of each fourth transistor M4 is connected with the low-level power supply terminal VGL, and a second electrode of the $j^{th}$ fourth transistor M4 is connected with the second signal line S(2j) of column 2j.

In an exemplary embodiment, the fourth transistor M4 may be a P-type or N-type transistor.

An exemplary structure of a first reset sub-circuit and a second reset sub-circuit is shown in FIG. 3. It is easily understandable to those skilled in that art that the implementations of the first reset sub-circuit and the second reset sub-circuit are not limited thereto.

In an exemplary embodiment, the types of the first transistor to the fourth transistor may be the same or may be different. When the types of the first transistor to the fourth transistor are the same, the manufacturing process of the imaging backplane can be simplified.

The following describes a technical solution of an imaging backplane according to an exemplary embodiment by a working process of the imaging panel.

Figure 4:
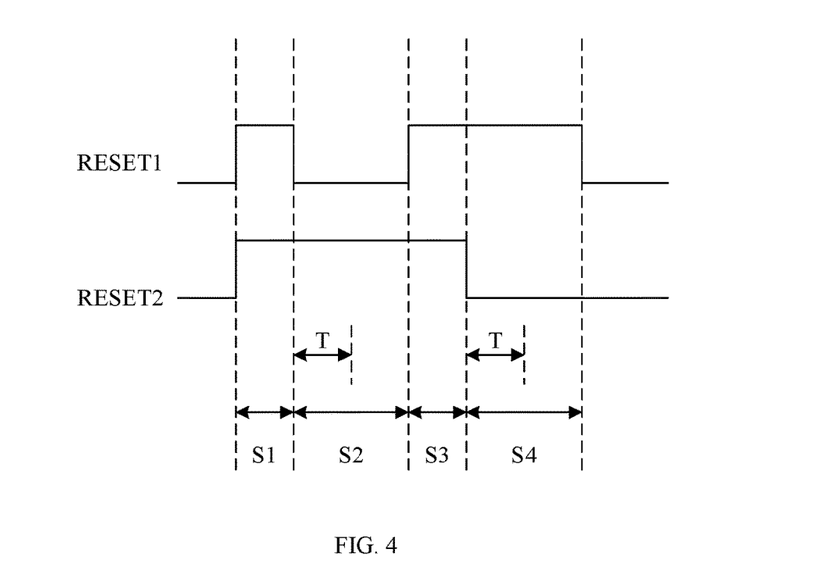
FIG. 4 is an operating timing diagram of an imaging backplane according to an exemplary embodiment.

Taking all the transistors in the imaging panel being N-type thin film transistors as an example, FIG. 4 is an operating timing diagram of an imaging panel according to an exemplary embodiment. As shown in FIG. 3 and FIG. 4, the operation process of the imaging panel includes:

In first stage S1, when the first point light source is turned on, the first signal lines of all even-numbered rows provide high-level signals, and all the second transistors M2 are turned on. The second reset terminal RESET2 provides a high-level signal, and all the fourth transistors M4 are turned on to provide all the second imaging units with a signal of a low-level power supply terminal VGL, thus ensuring that no charge is produced by any of the second imaging units when the first point light source is turned on. The first signal lines of odd-numbered rows are provided with high-level signals row by row, and all the first transistors M1 in each row of imaging structures are turned on. The first reset terminal RESET1 provides a high-level signal, all third transistors M3 are turned on, low-level signals are provided to all first imaging units, the first imaging units are reset, and after the resetting, the supply of high-level signals to the first signal lines of odd-numbered rows is stopped.

In second stage S2, the first signal lines of all even-numbered rows provide high-level signals, the second reset terminal RESET2 provides a high-level signal, all the fourth transistors M4 are turned on, and the signal of the low-level power supply terminal VGL is provided to all the second imaging units to ensure that no charge is produced by any of the second imaging units when the first point light source is turned on. The first reset terminal RESET1 provides a low-level signal, all the third transistors M3 are turned off, and the first imaging units will not be pulled down by the low-level signal. After a preset exposure time T elapses, high-level signals are provided row by row to the first signal lines of odd-numbered rows, all the first transistors M1 in each row of imaging structures are turned on, the first imaging units in each row of imaging structures receive light, and the electrical signals obtained by the photoelectric sensors according to the received light are collected by the second signal lines of odd-numbered columns.

In third stage S3, when the second point light source is turned on, the first signal lines of all odd-numbered rows provide high-level signals, and all the first transistors M1 are turned on. The first reset terminal RESET1 provides a high-level signal, and all the third transistors M3 are turned on to provide all the first imaging units with the signal of the low-level power supply terminal VGL, so that no charge is produced by any of the first imaging units when the second point light source is turned on. High-level signals are provided row by row to the first signal lines of even-numbered rows, and all the second transistors M2 in the imaging structures of each row are turned on. The second reset terminal RESET2 provides a high-level signal, all fourth transistors M4 are turned on to provide low-level signals to all the second imaging units to reset the second imaging units, and after the resetting, supply of high-level signals to the first signal lines of even-numbered rows is stopped.

In fourth stage S4, the first signal lines of all odd-numbered rows provide high-level signals, the first reset terminal RESET1 provides a high-level signal, all the third transistors M3 are turned on, and the signal of the low-level power supply terminal VGL is provided to all the first imaging units to ensure that no charge is produced by any of the first imaging units when the second point light source is turned on. The second reset terminal RESET2 provides a low-level signal, all the fourth transistors M4 are turned off, and the second imaging units will not be pulled down by the low-level signal. After the preset exposure time T elapses, high-level signals are provided row by row to the first signal lines of even-numbered rows, all the second transistors M2 in each row of imaging structures are turned on, the second imaging units in each row of imaging structures receive light, and the electrical signals obtained by the photoelectric sensors according to the received light are collected by the second signal lines of even-numbered columns.

When the imaging backplane is used for a one-time fingerprint identification, after the electrical signal obtained by the first imaging units is acquired, it will not be acquired for the second time, and the afterimage generated by the first imaging unit is irrelevant. The imaging backplane may not include the first reset sub-circuit, but only includes the second reset sub-circuit. The second reset sub-circuit is configured to ensure that no charge is produced by any of the second imaging units when the first point light source is turned on.

Figure 5:
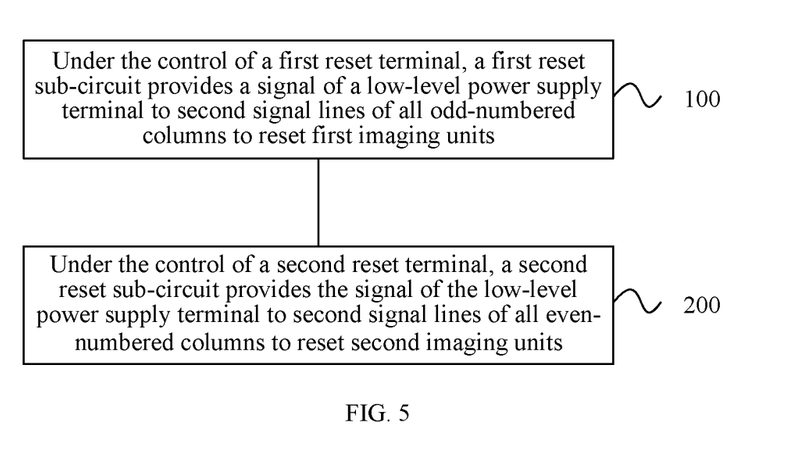
FIG. 5 is a flowchart of a driving method of an imaging backplane according to an embodiment of the present disclosure.

FIG. 5 is a flowchart of a driving method of an imaging backplane according to an embodiment of the present disclosure. As shown in FIG. 5, the driving method of an imaging backplane according to an embodiment of the present disclosure includes following steps:

In step 100, under the control of a first reset terminal, a first reset sub-circuit provides a signal of a low-level power supply terminal to second signal lines of all odd-numbered columns so as to reset first imaging units.

In step 200, under the control of a second reset terminal, a second reset sub-circuit provides the signal of the low-level power supply terminal to second signal lines of all even-numbered columns so as to reset second imaging units.

An order of step 100 and step 200 depends on which of the first imaging unit and the second imaging unit receives light when the first point light source is turned on. If the first imaging unit receives light when the first point light source is turned on, then step 200 occurs before step 100, and if the second imaging unit receives light, then step 100 occurs before step 200.

The imaging backplane in this embodiment is the imaging backplane according to any of the previous embodiments, and implementation principles and implementation effects thereof are similar, which will not be repeated here.

An embodiment of the present disclosure further provides a fingerprint identification panel, including a display panel, two point light sources and an imaging backplane.

The imaging backplane in this embodiment is the imaging backplane according to any of the previous embodiments, and implementation principles and implementation effects thereof are similar, which will not be repeated here.

In an exemplary embodiment, the point light sources are disposed on the display panel, and are configured to emit light. When a finger covers the display panel, the light is reflected back into the display panel by the finger at a base substrate and a surface of a mobile phone.

In an exemplary embodiment, the imaging backplane is disposed on the display panel and configured to receive light reflected by the finger to identify a fingerprint.

The point light sources are configured to be turned on sequentially according to a preset time sequence. When each point light source is turned on, the imaging backplane receives the light reflected by the finger in the corresponding area to form a fingerprint image.

The drawings in the present disclosure only refer to the structures involved in the embodiments of the present disclosure, and other structures may refer to common designs.

Although implementations disclosed in the present disclosure are as the above, the described contents are only implementations used for facilitating understanding the present disclosure, and are not used for limiting the present disclosure. Any person skilled in the art to which the present disclosure pertains may make any modifications and variations in the form and details of implementation without departing from the spirit and the scope of the present disclosure, but the patent protection scope of the present disclosure shall still be subject to the scope defined in the appended claims.

What is claimed is:

1. An imaging backplane, comprising:
    M rows and N columns of imaging structures, 2M rows of first signal lines, 2N columns of second signal lines, a first reset sub-circuit and a second reset sub-circuit,
    wherein each imaging structure comprises a first imaging unit and a second imaging unit, the first imaging unit of the imaging structure of row i and column j is connected with the first signal line of row $2i\text{-}1$ and the second signal line of column $2j\text{-}1$ respectively, and the second imaging unit of the imaging structure of row i and column j is connected with the first signal line of row $2i$ and the second signal line of column $2j$ respectively, wherein $1<i<M$ and $1<j<N$;
    the first reset sub-circuit is respectively connected with a first reset terminal, a low-level power supply terminal and the second signal lines of all odd-numbered columns, and is configured to provide a signal of the low-level power supply terminal to the second signal lines of all the odd-numbered columns under control of the first reset terminal, to reset the first imaging units; and
    the second reset sub-circuit is respectively connected with a second reset terminal, the low-level power supply terminal and the second signal lines of all even-numbered columns, and is configured to provide the signal of the low-level power supply terminal to the second signal lines of all the even-numbered columns under control of the second reset terminal, to reset the second imaging units,
    wherein for the imaging structure of row i and column j, the first imaging unit comprises P first imaging sub-units, and the second signal lines of column $2j\text{-}1$ comprise P columns of first sub-signal lines, wherein the P columns of first sub-signal lines correspond to the P first imaging subunits in a one-by-one manner; each first imaging subunit comprises a photoelectric sensor and a first switching element; the first switching element is respectively connected with the first signal line of row $2i\text{-}1$, the first sub-signal line corresponding to the first imaging subunit and the photoelectric sensor, where $P \geq 1$; or
    wherein for the imaging structure of row i and column j, the second imaging unit comprises Q second imaging subunits, and the second signal lines of column $2j$ comprise Q columns of second sub-signal lines, wherein the Q columns of second sub-signal lines correspond to the Q second imaging subunits in a one-by-one manner; each second imaging subunit comprises a photoelectric sensor and a second switching element; and the second switching element is respectively connected with the first signal line of row $2i$, the second sub-signal line corresponding to the second imaging subunit and the photoelectric sensor, where $Q \geq 1$.

2. The imaging backplane of claim 1, wherein the second signal line is multiplexed as a signal reading line, which is configured to read an electrical signal which is obtained by the photoelectric sensor according to received light.

3. The imaging backplane of claim 1, wherein for the imaging structure of row i and column j, the first switching element is a first transistor;
    a control electrode of the first transistor is connected with the first signal line of row $2i\text{-}1$, a first electrode of the first transistor is connected with a first sub-signal line corresponding to a first imaging subunit where the first switching element is located, and a second electrode of the first transistor is connected with the photoelectric sensor.

4. The imaging backplane of claim 1, wherein for the imaging structure of row i and column j, the second switching element is a second transistor;

a control electrode of the second transistor is connected with the first signal line of row $2i$, a first electrode of the second transistor is connected with a second sub-signal line corresponding to a second imaging subunit where the second switching element is located, and a second electrode of the second transistor is connected with the photoelectric sensor.

5. The imaging backplane of claim 1, wherein the first reset sub-circuit comprises N third transistors;

a control electrode of each third transistor is connected with the first reset terminal, a first electrode of each third transistor is connected with the low-level power supply terminal, and a second electrode of the $j^{th}$ third transistor is connected with the second signal line of column $2j-1$.

6. The imaging backplane of claim 5, wherein the second reset sub-circuit comprises N fourth transistors;

a control electrode of each fourth transistor is connected with the second reset terminal, a first electrode of each fourth transistor is connected with the low-level power supply terminal, and a second electrode of the $j^{th}$ fourth transistor is connected with the second signal line of column $2j$.

7. The imaging backplane of claim 1, wherein the second reset sub-circuit comprises N fourth transistors;

a control electrode of each fourth transistor is connected with the second reset terminal, a first electrode of each fourth transistor is connected with the low-level power supply terminal, and a second electrode of the $j^{th}$ fourth transistor is connected with the second signal line of column $2j$.

8. A fingerprint identification panel, comprising the imaging backplane of claim 1.

9. A driving method for an imaging backplane, wherein the imaging backplane comprises:

M rows and N columns of imaging structures, 2M rows of first signal lines, 2N columns of second signal lines, a first reset sub-circuit and a second reset sub-circuit, wherein each imaging structure comprises a first imaging unit and a second imaging unit, the first imaging unit of the imaging structure of row i and column j is connected with the first signal line of row $2i-1$ and the second signal line of column $2j-1$ respectively, and the second imaging unit of the imaging structure of row i and column j is connected with the first signal line of row $2i$ and the second signal line of column $2j$ respectively, wherein $1 < i < M$ and $1 < j < N$;

the first reset sub-circuit is respectively connected with a first reset terminal, a low-level power supply terminal and the second signal lines of all odd-numbered columns, and is configured to provide a signal of the low-level power supply terminal to the second signal lines of all the odd-numbered columns under control of the first reset terminal, to reset the first imaging units; and the second reset sub-circuit is respectively connected with a second reset terminal, the low-level power supply terminal and the second signal lines of all even-numbered columns, and is configured to provide the signal of the low-level power supply terminal to the second signal lines of all the even-numbered columns under control of the second reset terminal, to reset the second imaging units, wherein for the imaging structure of row i and column j, the first imaging unit comprises P first imaging subunits, and the second signal lines of column $2j-1$ comprise P columns of first sub-signal lines, wherein the P columns of first sub-signal lines correspond to the P first imaging subunits in a one-by-one manner; each first imaging subunit comprises a photoelectric sensor and a first switching element; the first switching element is respectively connected with the first signal line of row $2i-1$, the first sub-signal line corresponding to the first imaging subunit and the photoelectric sensor, where $P \geq 1$; or wherein for the imaging structure of row i and column j, the second imaging unit comprises Q second imaging subunits, and the second signal lines of column $2j$ comprise Q columns of second sub-signal lines, wherein the Q columns of second sub-signal lines correspond to the Q second imaging subunits in a one-by-one manner; each second imaging subunit comprises a photoelectric sensor and a second switching element; and the second switching element is respectively connected with the first signal line of row $2i$, the second sub-signal line corresponding to the second imaging subunit and the photoelectric sensor, where $Q \geq 1$, wherein the method comprises:

a first reset sub-circuit provides a signal of a low-level power supply terminal to second signal lines of all odd-numbered columns under control of a first reset terminal, to reset first imaging units; and a second reset sub-circuit provides the signal of the low-level power supply terminal to second signal lines of all even-numbered columns under control of a second reset terminal, to reset second imaging units.

* * * * *